Jan. 9, 1962     H. H. NEEDHAM     3,016,463
MULTI-LAYER VESSEL HAVING A NEUTRON ABSORBING LAYER
Filed April 28, 1958
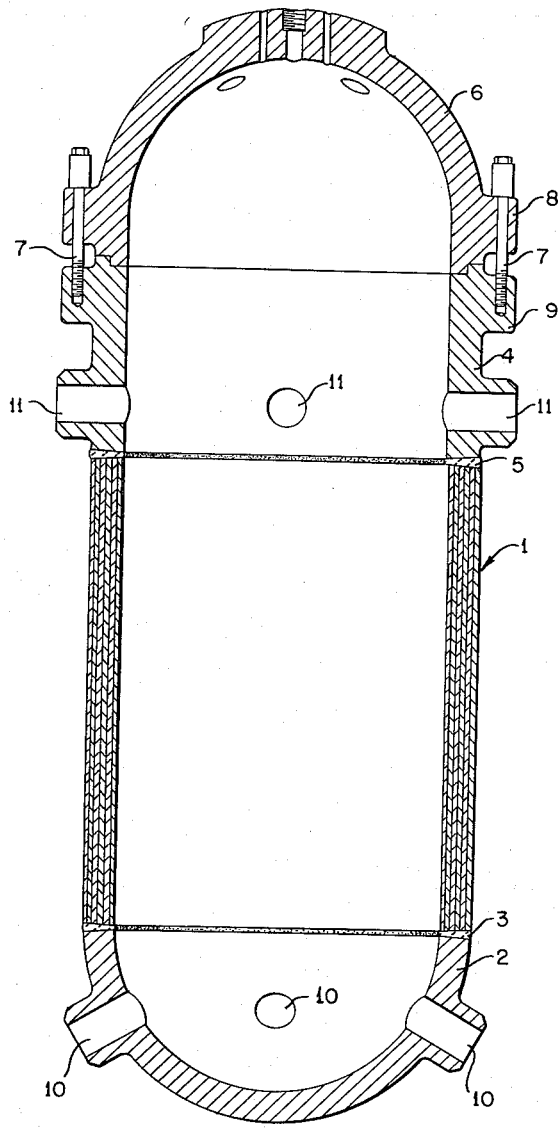
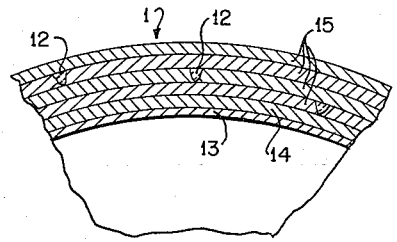
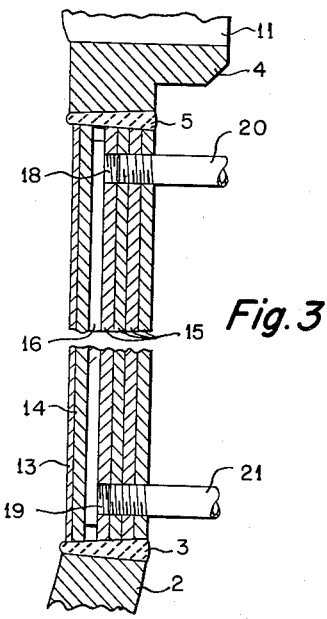
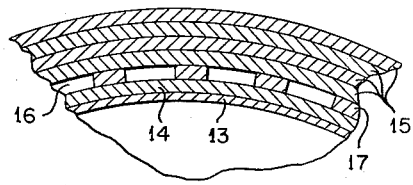
INVENTOR
HOWARD H. NEEDHAM, DECEASED,
BY   MARGARET NEEDHAM, EXECUTRIX
BY *Andrus & Starke*
Attorneys United States Patent Office 3,016,463
Patented Jan. 9, 1962

3,016,463
MULTI-LAYER VESSEL HAVING A NEUTRON ABSORBING LAYER
Howard H. Needham, deceased, late of Wauwatosa, Wis., by Margaret Needham, executrix, Wauwatosa, Wis., assignor to A. O. Smith Corporation, Milwaukee, Wis., a corporation of New York
Filed Apr. 28, 1958, Ser. No. 731,342
7 Claims. (Cl. 250—108)

This invention relates to a multi-layer vessel and more particularly to a multi-layer reactor pressure vessel in which at least one of the layers is formed of a material having a high rate of neutron absorption.

The conventional nuclear reactor pressure vessel is a thick-walled vessel in which heavy internal shields are supported within the vessel in spaced relation to the walls to absorb radiation energy from the atomic core. The shields not only serve to absorb the radiation energy, reduce radiation damage to structural parts, and minimize radiation losses, but also protect the vessel wall from the temperature differences induced by radiation and the resulting thermal stresses accompanying the temperature drops. The use of shields, however, requires an intricate supporting structure to suspend the shields within the vessel and also increases the overall size of the reactor.

The present invention is directed to a multi-layer reactor pressure vessel having a wall section formed of a plurality of relatively thin metal layers tightly disposed about one another in superimposed relation. To absorb neutrons, one or more layers of a material having a high rate of neutron absorption are disposed between the layers of the reactor wall and are in effect in integral part of the wall.

The neutron absorption layer may be located adjacent a cooling surface or cooling passage so that the heat generated by the absorption of the neutrons can be readily transferred to the cooling media and thereby regulate the temperature within the vessel wall.

By incorporating the neutron absorbing layer within the layers of the vessel wall, the radiation loss through the vessel wall is reduced and the internal shielding can also be reduced. By reducing the internal shielding and the shielding supports, the overall size of the reactor pressure vessel can be decreased.

Other objects and advantages will appear in the course of the following description.

The drawings illustrate the best mode contemplated of carrying out the present invention.

In the drawings:

FIGURE 1 is a longitudinal section of a multi-layer reactor pressure vessel;

FIG. 2 is an enlarged fragmentary section of the multi-layer vessel wall embodying the present invention; and FIG. 3 is a fragmentary longitudinal section of a modified form of the invention in which cooling passages are incorporated within the vessel wall.

The drawings illustrate a vessel for use as a nuclear reactor or the like and comprises a cylindrical shell 1 which is enclosed at the lower end by a generally hemispherical head 2. The head 2 is secured to the cylindrical shell 1 by the girth weld 3.

The upper end of shell 1 is secured to a cylindrical forging 4 by girth weld 5 and the upper end of the forging 4 is closed off by a head 6. The head 6 is attached to the forging 4 by bolts 7 which extend through suitable openings in the flange 8 of head 6 and are threadedly engaged within openings formed in the matching flange 9 of forging 4.

A heat exchange medium, such as water, which is adapted to absorb heat from the atomic core is introduced into the pressure vessel through inlets 10 formed in the lower head 2 and is discharged through outlets 11 formed in forging 4.

As best shown in FIG. 2, the shell 1 is formed of a plurality of layers which are tightly disposed in one another in superimposed relation. As shown, there are six layers. However, there can be any desired number of layers depending on the particular strength requirements of the reactor and the layers can be of various thicknesses.

The longitudinal edges of each of the layers are secured together by longitudinal welds 12 which are preferably staggered throughout the circumference of the reactor wall.

The innermost layer 13 of shell 1 is preferably formed of or clad with a corrosion resistant material, such as stainless steel or the like, in order to withstand the corrosion of the heat exchange medium which is passing within the reactor.

According to the invention, one or more of the intermediate layers in the vessel wall are formed of a neutron absorbing material. As shown in FIG. 2, the neutron absorbing layer is the second innermost layer 14 but it is contemplated that layer 14 can be disposed anywhere within the wall thickness and preferably adjacent the location of a cooling surface or cooling medium. The cooling water is circulated within the reactor and passes in direct contact with the innermost layer 13 and thus the neutron absorbing layer 14 is in proximate relation to the cooling water passing within the reactor.

The remaining layers 15 of the vessel are preferably formed of carbon steel or a material having the particular mechanical properties necessary to provide the strength requirements for the reactor.

The neutron absorbing layer 14, in itself, does not necessarily add to the strength of the reactor wall but can merely transmit pressures from the inner layer 13 to the outer layers 15 of the reactor wall.

The neutron absorbing layer 14 may be formed of any material having a thermal neutron cross section substantially greater than the remaining layers of the vessel and generally over 200 barns. The layer 14 can be an elementary substance with a relatively high microscopic neutron absorption cross section, such as boron, cadmium, samarium, europium, gadolinium, dysptrosium, indium or mercury, or the layer 14 can be material containing these substances.

For example, boron can be used as an alloy of 18–8 stainless steel in which the stainless steel contains between 1 to 3% of boron, or the neutron absorbing layer may be composed of boron carbide, $B_4C$, powder which is disposed between the layers of the vessel wall. In another form, the boron may be used with aluminum in a solid mixture which may be composed of about 50% aluminum and 50% boron carbide and this mixture is then used as the layer 14.

The boron may also be employed in a cement material which can be used as the layer 14. In this form, the boron could be used as the compound sodium boride.

In another form, the boron as sodium boride may be incorporated in frit glass and employed as powder or fibers for use as the layer 14.

Similarly, the other metals can be alloyed or used as compounds or mixtures similar to that described with boron as long as the resulting material has a thermal neutron cross section appropriate for the conditions of application and generally over 200 barns.

Depending on the circumstance, it may be desirable to pick an absorbing material for the layer 14 which does not emit gamma radiation on the absorption of neutrons and does not yield a highly radio-active nuclei.

It may also be desirable, under certain conditions, to adjust the thermal neutron cross section by adjusting the composition of layer 14 so that neutron absorption occurs at the desired rate for either high or low neutron fluxes.

In selecting a material for layer 14, the material, in addition to having the aforementioned thermal neutron cross section, should have a sufficiently high thermal conductivity so that the advantages of the neutron absorption will not be outweighed by an increased temperature in the outer layers and temperature differential across the absorbing layer due to the low conductivity. Similarly, the absorbing layer should not have an excessively low density so as to permit increased transmission of gamma radiation. The layer should have a sufficiently high density so that the advantages of neutron absorption are not overbalanced by an increase in gamma radiation transmission.

The multi-layer structure permits a neutron absorbing layer 14 to be incorporated as an integral part of the vessel wall and yet the neutron absorbing material will be out of contact with the water passing through the vessel and will not be subject to corrosion by this water.

The neutron absorbing layer 14 minimizes the leakage of neutron flux through the reactor vessel wall and also minimizes the amount of internal shielding that is required within the vessel. By minimizing the internal shielding, the need for shielding supports is reduced and the overall size of the reactor vessel can also be reduced.

FIG. 3 shows a modified form of the invention in which a series of cooling passages 16 are located outwardly adjacent the neutron absorbing layer 14. The passages 16 are formed by inserting a series of spacer bars 17 between the layer 14 and the adjacent outer layer 15. The bars 17 are disposed longitudinally of the shell and are spaced in circumferential relation.

To introduce a cooling medium, such as water, into passages 16, the shell wall is provided with a pair of openings 18 and 19 which extend from the exterior of the shell inwardly to the passages 16. Suitable conduits 20 and 21 are threadedly engaged into each of the openings 18 and 19, respectively, and conduit 20 serves to conduct water from a source, not shown, to inlet opening 18 and conduit 21 serves to discharge water from the outlet opening 19.

With this construction, heat generated in the neutron absorbent layer 14 will be transferred to the cooling medium within the passages 18 which will result in a substantial temperature decrease in the outer layers 15 of the vessel wall. The reduced temperature in the outer layers correspondingly reduces thermal stresses set up in these layers.

The present invention aids in controlling the location of the generation of heat within the reactor vessel wall due to the absorption of neutron flux and reduces the thermal stresses in the vessel wall by locating the absorption layer adjacent a cooling passage or a cooling surface.

While the above description is directed to the absorbing layer and cooling passages being associated with the cylindrical shell, it is contemplated that they may also be associated with the heads or other portions of the vessel wall.

Various modes of carrying out the invention are contemplated as being within the scope of the following claims particularly pointing out and distinctly claiming the subject matter which is regarded as the invention.

I claim:

1. In a multi-layer vessel adapted to contain radio-active materials under high temperature and pressure, a wall section formed of a plurality of thin metal super-imposed layers, a neutron absorbing layer disposed between two adjacent metallic layers and forming an integral part of said wall section, said neutron absorbing layer being formed of a material having a thermal neutron cross section greater than 200 barns and serving to absorb a substantial portion of the neutrons emitted by the radio-active materials and thereby control the distribution of the heat generated within said wall section by the absorption of said neutrons, and means for introducing a cooling medium into heat transfer relation with said absorbing layer to effect a transfer of heat from said absorbing layer to the cooling medium and thereby decrease the thermal stresses in the wall section.

2. In a multi-layer vessel adapted to contain radio-active materials under high temperature and pressure, a generally cylindrical wall section formed of a plurality of superimposed cylindrical layers with the innermost of the layers being formed of a corrsion resistant material and all of said layers having substantially the same thickness, a neutron absorbing layer disposed outwardly adjacent said innermost layer and forming an integral part of said wall section, said neutron absorbing layer being formed of a material having a thermal neutron cross section greater than 200 barns and containing a metal selected from the group consisting of boron, cadmium, samarium, europium, gadolinium, dysprosium, indium and mercury, said neutron absorbing layer serving to absorb a substantial portion of the neutrons emitted by the radio-active materials and thereby control the distribution of the heat generated within said wall section by the absorption of said neutrons, and means for introducing a cooling medium into heat transfer relation with said absorbing layer to effect a transfer of heat from said absorbing layer to the cooling medium and thereby decrease the thermal stresses in the wall section.

3. In a multi-layer vessel adapted to contain radio-active materials under high temperature and pressure, a wall section formed of a plurality of superimposed layers disposed in intimate contact and having a cooling passage disposed between two adjacent layers, means for circulating a cooling medium within said cooling passage, a neutron absorbing layer disposed within said wall section immediately adjacent said cooling passage, said absorbing layer having a thermal neutron cross section greater than 200 barns and serving to absorb a substantial portion of the neutrons emitted by the radio-active materials and thereby control the distribution of the heat generated within said wall section by the absorption of said neutrons, and said heat being transferred to the cooling medium to thereby decrease the thermal stresses in the wall section.

4. In a multi-layer wall section for use in a pressure vessel adapted to contain radio-active materials under high temperature and pressure, an innermost layer of a corrosion resistant material, a neutron absorbing layer disposed outwardly adjacent said innermost layer and forming an integral part of said wall section, said neutron absorbing layer being formed of a material having a thermal neutron cross section greater than 200 barns and containing a metal selected from the group consisting of boron, cadmium, samarium, europium, gadolinium, dysprosium, indium and mercury, said neutron absorbing layer serving to absorb a substantial portion of the neutrons emitted by the radio-active materials and thereby control the distribution of the heat generated within said wall section by the absorption of said neutrons, a series of spaced members disposed on the outer surface of said absorbing layer with the spaces between said members defining a series of cooling passages for the circulation of a cooling medium, and at least one metallic layer disposed outwardly of said members to provide the necessary physical properties for the multi-layer wall section, the heat generated in said absorbing layer by the absorption of neutrons being transferred to said cooling medium to thereby decrease the thermal stresses in the wall section.

5. In a multi-layer vessel adapted to contain radio-active materials under high pressures and temperatures, a generally cylindrical shell disposed in contact with radio-active materials and fabricated from a plurality of super-imposed metal layers tightly disposed about one another, the innermost of said layers being formed of stainless steel and the remainder of said layers being carbon steel, a neutron absorbing layer disposed between two adjacent metal layers and forming an integral part of said wall section, said neutron absorbing layer being formed of a material having a thermal neutron cross section greater than 200 barns and serving to absorb a substantial portion of the neutrons emitted by the radio-active materials, and means for introducing a cooling medium into heat transfer relation with said neutron absorbing layer to effect the transfer of heat from said absorbing layer to the cooling medium and thereby decrease the thermal stresses in said multi-layer shell.

6. In a multi-layer vessel adapted to contain radio-active materials under high pressures and temperatures, a generally cylindrical shell formed of a series of superimposed metal layers tightly disposed about one another, the innermost of said layers being formed of a corrosion resistant material, a neutron absorbing layer disposed between two adjacent metal layers and forming an integral part of said shell, said neutron absorbing layer being formed of a material having a thermal neutron cross section greater than 200 barns and serving to absorb a substantial portion of the neutrons emitted by the radio-active materials, means for providing an annular cooling passage within said shell adjacent said neutron absorbing layer, and means for introducing a cooling fluid into said annular passage to effect a transfer of heat from said neutron absorbing layer to the cooling fluid to thereby decrease the thermal stresses in said multi-layer shell.

7. A multi-layer vessel adapted to contain radio-active materials under high pressure and temperature, comprising a wall section including a plurality of generally cylindrical thin metallic structural layers with each layer having substantially the same thickness and disposed in tight engagement with adjacent layers, each of said layers having a pair of substantially longitudinal edges, a weld joining the longitudinal edges of each of said layers, a neutron absorbing layer disposed between two adjacent structural layers and forming an integral part of the wall section, said neutron absorbing layer being formed of a material having a thermal neutron cross section greater than 200 barns and serving to absorb a substantial portion of the neutrons emitted by the radio-active material and thereby control the distribution of the heat generated by the absorption of said neutrons within said wall section, and a head welded to each end of said wall section to provide a closed vessel.

References Cited in the file of this patent

UNITED STATES PATENTS

| | | |
|---|---|---|
| 2,807,727 | Fermi et al. | Sept. 24, 1957 |
| 2,853,624 | Wigner et al. | Sept. 23, 1958 |
| 2,874,307 | Wigner et al. | Feb. 17, 1959 |

OTHER REFERENCES

"Radiation Shielding," by Price, Horton and Spinney, chap. 6, pages 230 to 258, published by Pergamon Press, 122 East 55th Street, New York 22, N.Y., March 1957.